United States Patent [19]

Mackaness

[11] 4,096,844
[45] Jun. 27, 1978

[54] INTERNAL COMBUSTION ENGINE APPARATUS

[76] Inventor: James Bellamy Mackaness, 28 The Crescent, Chettenham, NSW, Australia, 2119

[21] Appl. No.: 755,718

[22] Filed: Dec. 30, 1976

Related U.S. Application Data

[63] Continuation of Ser. No. 443,515, Feb. 19, 1974, abandoned.

[51] Int. Cl.$^2$ .............................................. F02F 1/00
[52] U.S. Cl. .............................. 123/193 P; 123/32 C; 123/191 SP
[58] Field of Search ............ 123/32 B, 32 ST, 32 SP, 123/32 C, 32 D, 32 K, 48 R, 48 D, 75 B, 78 R, 78 A, 78 B, 191 S, 191 SP, DIG. 4, 193 P, 193 CP

[56] References Cited

U.S. PATENT DOCUMENTS

| 2,048,223 | 7/1936 | Scott | 123/32 SP |
| 2,146,032 | 2/1939 | Scott | 123/32 B |
| 2,154,505 | 4/1939 | Griffith | 123/78 A |
| 2,170,266 | 8/1939 | Leissner | 123/78 B |
| 2,393,749 | 1/1946 | Cadella | 123/78 A |
| 2,534,860 | 12/1950 | Fisher | 123/191 SP |
| 2,590,000 | 3/1952 | Ferguson | 123/32 B |
| 2,970,581 | 2/1961 | Georges | 123/191 SP |
| 3,270,722 | 9/1966 | Bernard | 123/32 ST |
| 3,682,147 | 8/1972 | Irgens | 123/48 R |

FOREIGN PATENT DOCUMENTS

| 507,086 | 11/1954 | Canada | 123/78 R |
| 639,889 | 7/1928 | France | 123/32 B |

Primary Examiner—Charles J. Myhre
Assistant Examiner—David D. Reynolds
Attorney, Agent, or Firm—John E. Toupal

[57] ABSTRACT

Disclosed herein is apparatus including all of the components present in a conventional internal combustion engine such as body forming cylinder walls that define a primary combustion chamber, a piston reciprocable in the cylinder between compression and power strokes, intake means for introducing fuel charges into the primary combustion chamber, ignition means for igniting fuel charges and exhaust means for removing residual gases from the primary chamber after ignition of each fuel charge. Added to these conventional engine components is a housing that defines an auxiliary combustion chamber and an orifice that provides communication between the primary and auxiliary combustion chambers. During operation of the engine, both the primary and auxiliary chambers are charged with a fuel mixture after which the charge in the auxiliary chamber is ignited producing a jet of turbulent flame that passes through the orifice into the primary chamber inducing complete and uniform mixing and burning of the fuel mixture retained thereby. Optimum performance of the engine is insured by a purging mechanism that moves through the auxiliary combustion chamber after each ignition cycle so as to force residual gases out of the orifice which therefore functions also as an exhaust port. This purging provides a free volume for receiving an undiluted fresh fuel charge.

5 Claims, 6 Drawing Figures

INTERNAL COMBUSTION ENGINE APPARATUS

CROSS-REFERENCE TO RELATED APPLICATION

This invention is a continuation of U.S. application Ser. No. 443,515, filed Feb. 19, 1974 now abandoned, and entitled "Internal Combustion Engine Apparatus".

BACKGROUND OF THE INVENTION

This invention relates generally to internal combustion engines and, more particularly, to spark ignition internal combustion engines that produce maximum power with lean air-fuel mixtures and with reduced emission of unburned hydrocarbons, carbon monoxide and oxides of nitrogen which are the principal atmospheric pollutants.

In spark ignition internal combustion engines, a compressed mixture of fuel and air is ignited by an electric spark passing across a gap between the electrodes of a spark plug. Tests on such engines as now used show that imperfect combustion of the fuel mixture occurs and is due to a number of causes. The primary causes are non-uniform burning or in effect explosion rather than burning of the fuel mixture after ignition, incomplete burning of the fuel mixture because of inadequate mixing of the air and fuel mixture and existence of unburned gas residues that dilute each new incoming fuel charge. As a result of the foregoing and other causes, imperfect combustion results in noxious and other atmospheric pollutants appearing in the engine's exhaust gases.

One solution to the above problems was proposed in U.S. Pat. No. 2,924,210. The internal combustion engine disclosed in that patent provides an auxiliary combustion chamber that communicates with the main combustion chamber through an orifice. As disclosed, a fuel charge is first ignited in the auxiliary chamber producing a turbulent flame front that passes through the orifice into the main combustion chamber to induce complete and uniform burning therein. An improvement of the engine described in U.S. Pat. No. 2,925,210 is disclosed in U.S. Pat. No. 3,776,212. This latter patent also describes an internal combustion engine having an auxiliary combustion chamber that expels a turbulent flame front into a primary combustion chamber. However, the patent further discloses various parameters required to provide optimum performance in an engine of this type. Described therein is a ratio of main and auxiliary combustion chamber volumes and a size of communicating orifice such that during a compression cycle of the engine, part of the combustible mixture of fuel and air rushes into the auxiliary chamber causing turbulence that enhances ignition therein. After ignition, the combustion products rush out of the auxiliary chamber into the main chamber again producing turbulence sufficient to provide complete combustion of a very lean air-fuel mixture within a 60° crank angle. In addition, there is described a communicating orifice sufficiently large that the burning jet passing therethrough into the primary combustion chamber will not be quenched by excessive turbulence but rather will continue as a moving flame front producing uniform and complete ignition in the primary chamber.

The above patents, particularly the latter, appear to provide promising approaches to the solution of problems caused by imperfect fuel combustion in conventional internal combustion engines. Neither patent, however, considers to any great extent a problem unique to engines of this type. That problem stems from incomplete purging of the auxiliary combustion chamber after each ignition cycle. Without complete purging, fuel charges introduced into the auxiliary chamber will be diluted to detrimentally affect fuel burning in the auxiliary chamber and correspondingly diminish the effects of the auxiliary chamber on the burning process that occurs in the primary combustion chamber.

The object of this invention, therefore, is to provide an internal combustion engine having an auxiliary combustion chamber that expels a turbulent flame front into a primary combustion chamber and further includes a mechanism for insuring complete purging of the auxiliary chamber after each ignition cycle.

SUMMARY OF THE INVENTION

The present invention includes all of the components present in a conventional internal combustion engine such as a body forming cylinder walls that define a primary combustion chamber, a piston reciprocable in the cylinder during compression and power strokes, intake means for introducing fuel charges into the primary combustion chamber, ignition means for igniting fuel charges and exhaust means for removing residual gases from the primary chamber after ignition of each fuel charge. Added to these conventional engine components is a housing that defines an auxiliary combustion chamber and an orifice that provides communication between the primary and auxiliary combustion chambers. During operation of the engine, both the primary and auxiliary chambers are charged with a fuel mixture after which the charge in the auxiliary chamber is ignited producing a jet of turbulent flame that passes through the orifice into the primary chamber inducing complete and uniform mixing and burning of the fuel mixture retained thereby. Optimum performance of the engine is insured by a purging mechanism that moves through the auxiliary combustion chamber after each ignition cycle so as to force residual gases out of the orifice which therefore functions also as an exhaust port. This purging provides a free volume for receiving an undiluted fresh fuel charge.

In a preferred embodiment of the invention the housing defining the auxiliary combustion chamber is mounted in a wall of the main piston with the exhaust port located in the side of the piston wall facing the primary combustion chamber and the remaining portion of the housing extending out of the opposite side of the piston wall. Mounted in the housing is an auxiliary piston reciprocable in the auxiliary combustion chamber and biased toward the exhaust port by a spring member. The spring member's parameters are selected so as to produce reciprocating movement of the auxiliary piston in response to pressure changes within the primary combustion chamber Thus, during each compression stroke of the primary piston, the resultant increased pressure in the primary chamber forces the auxiliary piston inwardly to allow entrance of a fuel charge. Conversely, during a power stroke by the primary piston the reducing pressure in the primary chamber during the last part of the firing cycle allows the bias spring member to force the auxiliary piston outwardly insuring a complete purging of the auxiliary chamber in addition to insuring a uniform and complete expulsion of a turbulent flame front that enhances burning of the charge in the primary chamber. Furthermore, movement of the auxiliary chamber's orifice along with the primary piston aids in distributing the expelled flame front through the primary chamber. In a modified version of this embodiment, the auxiliary chamber housing is formed in the head of the main engine body rather than in the primary piston. This modified version operates in the same manner but the advantage of having the auxiliary chamber's discharge orifice move through the primary combustion chamber is lost.

In another embodiment of the invention, the auxiliary combustion chamber is formed in the head of the main engine body and a transfer passage is provided between the primary combustion chamber and an end of the auxiliary chamber opposite the exhaust port. In addition, there is formed in the engine body a small purge chamber communicating with the transfer passage and a small purge piston extends out of the primary piston. The purge chamber is disposed to receive the purge piston upon completion of the primary piston's compression stroke. Movement of the purge piston into the purge chamber forces the trapped volume of fuel charge through the transfer passage and into the auxiliary combustion chamber through which it moves forcing all residual gases from the previous combustion cycle out of the exhaust port. Thus, a completely purged auxiliary chamber and resultant undiluted fuel charge is insured for each ignition cycle.

DESCRIPTION OF THE DRAWINGS

These and other objects and features of the present invention will become more apparent upon a perusal of the following description taken in conjunction with the accompanying drawings wherein.

DESCRIPTION OF THE PREFERRED EMBODIMENTS

Figure 1:
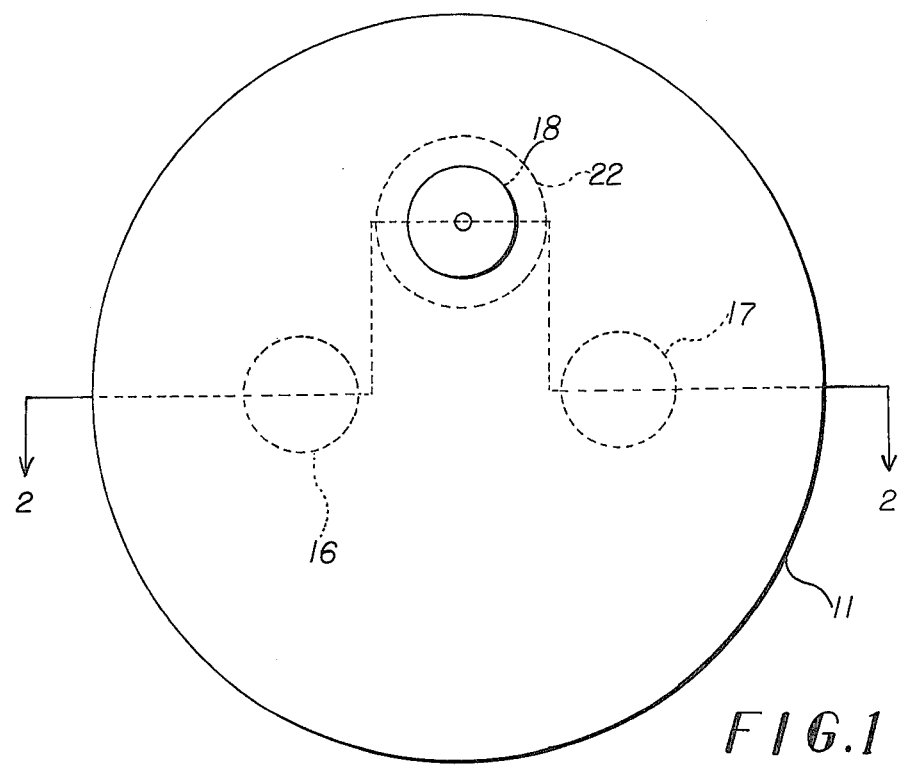
FIG. 1 is a diagramatic plan view illustrating the relative positions of various engine components in an engine embodiment shown in FIG. 2.
Figure 2:
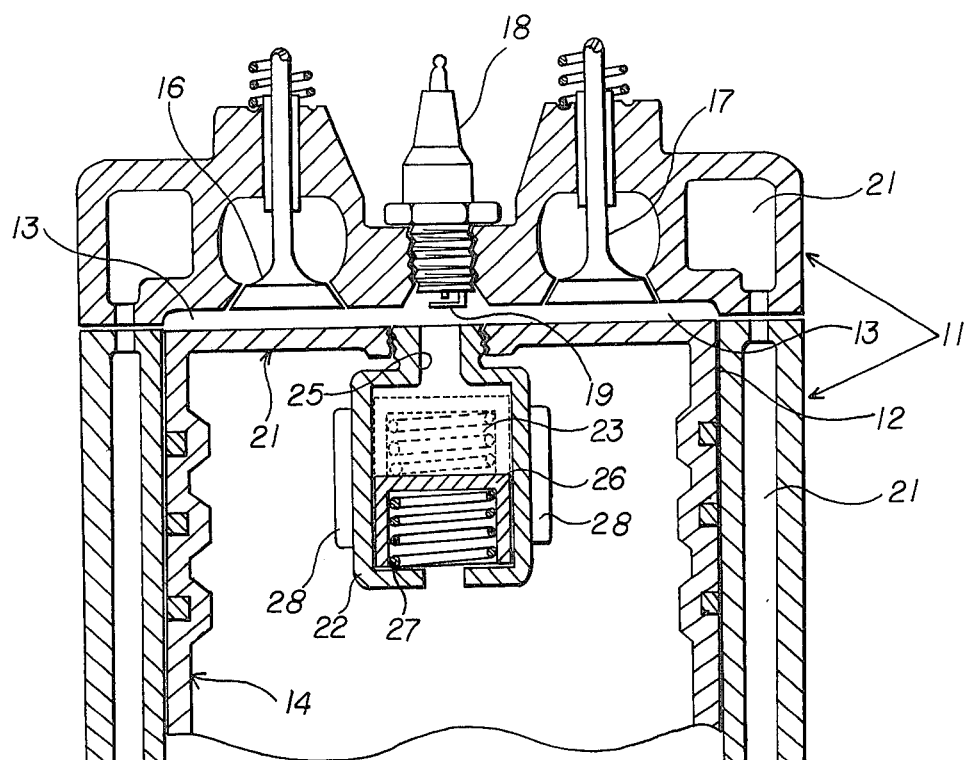
FIG. 2 is a schematic cross sectional view taken along lines 2—2 of FIG. 1.

Referring now to FIGS. 1 and 2 there is shown an engine body 11 having an inner cylindrical wall surface 12 that defines a primary combustion chamber 13. Conventionally mounted for reciprocating and alternating compression and power strokes within the primary chamber 13 is a primary piston member 14. An intake valve 16 is supported by the body 11 and facilitates, in the conventional manner, injection of fuel charges into the primary combustion chamber 13. Similarly, residue gases remaining after an ignition cycle are removed from the chamber 13 via an exhaust valve 17 also supported by the engine body 11. A spark plug 18 extends through the body 11 providing spark ignition electrodes 19 within the combustion chamber 13 while cooling of the engine is provided by circulating water through jackets 21 formed in the engine body 11.

Engaged by threads through a wall 21 of the piston 14 is a hollow cylindrical housing 22 that defines an auxiliary combustion chamber 23. Also formed by the housing 22 is an orifice 25 that opens out of the side of the piston wall 21 facing the primary combustion chamber 13 so as to provide communication between that chamber and the auxiliary chamber 23. An auxiliary piston 26 is mounted for reciprocable movement within the auxiliary chamber 23 and is biased toward the orifice 25 by a spring member 27. Extending from the outer surface of the housing 22 are a plurality of heat exchange fins 28 disposed to receive a cooling oil spray directed in a conventional manner against the inner surfaces of the piston 14 from the engine's crankcase (not shown).

During operation of the engine shown in FIGS. 1 and 2, the primary piston 14, the intake valve 16, the exhaust valve 17 and the spark plug 18 function in the conventional manner whereby a fuel charge introduced into the primary chamber 13 is compressed during a compression stroke by the piston 14, is ignited by a spark across the electrodes 19 resulting in burning of the fuel charge and producing a power stroke by the piston 14 after which residual gases are removed through the exhaust valve 17. Dissimilarly than conventional engines, however, upon completion of a compression stroke by the piston 14, the high pressure in the primary chamber 13 is communicated through the orifice 25 forcing the auxiliary piston 26 into the inward position shown in FIG. 2. In this way, the auxiliary chamber 23 is also filled with a fuel charge from the primary chamber 13. This charge within the auxiliary chamber 23 is ignited by the spark plug 18 and a jet of flame is expelled through the orifice 25 into the primary chamber 13 through which it moves as a turbulent flame front including complete mixing and burning of the fuel mixture therein. The ratio of the volumes of the primary chamber 13 and the auxiliary chamber 23 and the size of the orifice 25 are such that during the compression stroke of the piston 14 the combustible mixture of fuel and air rushes into the auxiliary chamber 23 causing great turbulence therein and after subsequent ignition the combustion products rush out of the auxiliary chamber 23 causing sufficient turbulence in the primary chamber 13 to produce complete combustion therein of a very lean air-fuel mixture within a 60° crank angle. Furthermore, the size of the orifice 25 is sufficiently large that the burning jet issuing therefrom into the primary chamber 13 will not be quenched by excessive turbulence. As noted above, the design parameters of the auxiliary chamber 23, the orifice 25 and the primary chamber 13 that will insure optimum operational relationship are disclosed in U.S. Pat. No. 3,776,212.

During the power stroke by the piston 14, the reducing pressure in the primary chamber 13 permits the spring member 27 to force the auxiliary piston 26 upwardly until it reaches the position shown dotted in FIG. 2. This movement of the auxiliary piston 26 forces all residual gases in the auxiliary chamber 23 out of the orifice 25 insuring a free volume for receiving an undiluted fuel charge during the next compression cycle. Thus, the auxiliary piston functions as a purge mechanism and the orifice 25 functions as an exhaust port for insuring complete purging of the auxiliary chamber 23.

The piston member 26 is selected to be very light and possesses with the spring 27 a very high natural frequency so that the position of the auxiliary piston 26 will be determined solely by the spring and the pressure within the primary chamber 13 rather than by any acceleration forces generated by the moving piston 14. Preferably, the spring member 27 will be fully compressed by the auxiliary piston 26 in response to a pressure in the primary chamber 13 of about five atmospheres.

Another advantage provided by the embodiment of FIG. 2 is that the flame jet ensuing from the orifice 25 will be distributed through the primary chamber 13 due to the movement of the housing 22 during the power stroke of the primary piston 14. This distribution facilitates complete mixing and burning of the fuel mixture in the primary chamber 13. It will be appreciated that absolute seals between the auxiliary piston 26 and the housing 22 are not required in that any leakage occurring during the compression stroke will merely circulate into the crankcase and be returned to an induction system (not shown) in the conventional manner.

Figure 3:
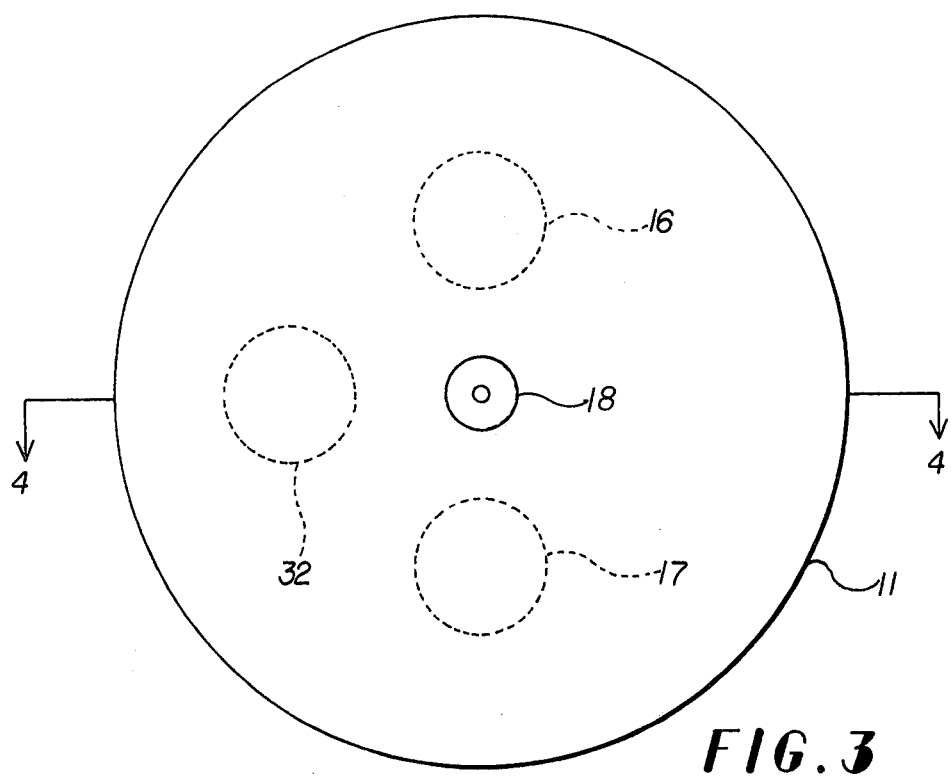
FIG. 3 is a diagramatic view illustrating the relative positions of various engine components in an engine embodiment shown in FIG. 4.
Figure 4:
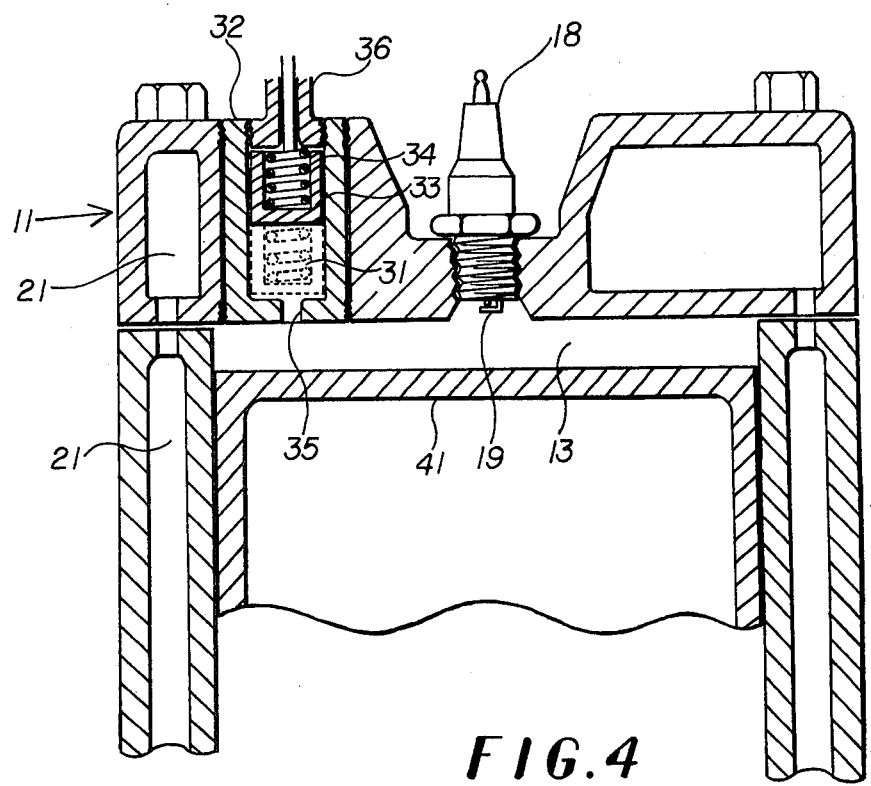
FIG. 4 is a cross sectional view taken along lines 4—4 in FIG. 3.

Referring now to FIGS. 3 and 4 there is shown another embodiment of the invention in which components identical to those shown in FIGS. 1 and 2 have been given the same reference numerals. This embodiment is basically the same as that shown in FIGS. 1 and 2 except that an auxiliary combustion chamber 31 is formed by a housing 32 mounted in the engine body 11 rather than in the primary piston 14. Again, the housing 32 retains an auxiliary piston 33 that is biased by a spring member 34 toward an orifice 35 opening into the primary combustion chamber 13. Also added is a tubulation 36 that provides communication between the interior of the housing 32 and an induction system (not shown) of the engine. The tubulation 36 prevents loss of any fuel leaking between the auxiliary piston 33 and the housing 32 during a compression stroke by the primary piston 14. It will be appreciated that this embodiment functions in the same manner as described above in connection with the embodiment of FIGS. 1 and 2. However, the stationary housing 32 does not enhance distribution of the flame jet ensuing from the orifice 35 in the manner provided by the moving housing 22 in the embodiment described above.

Figure 5:
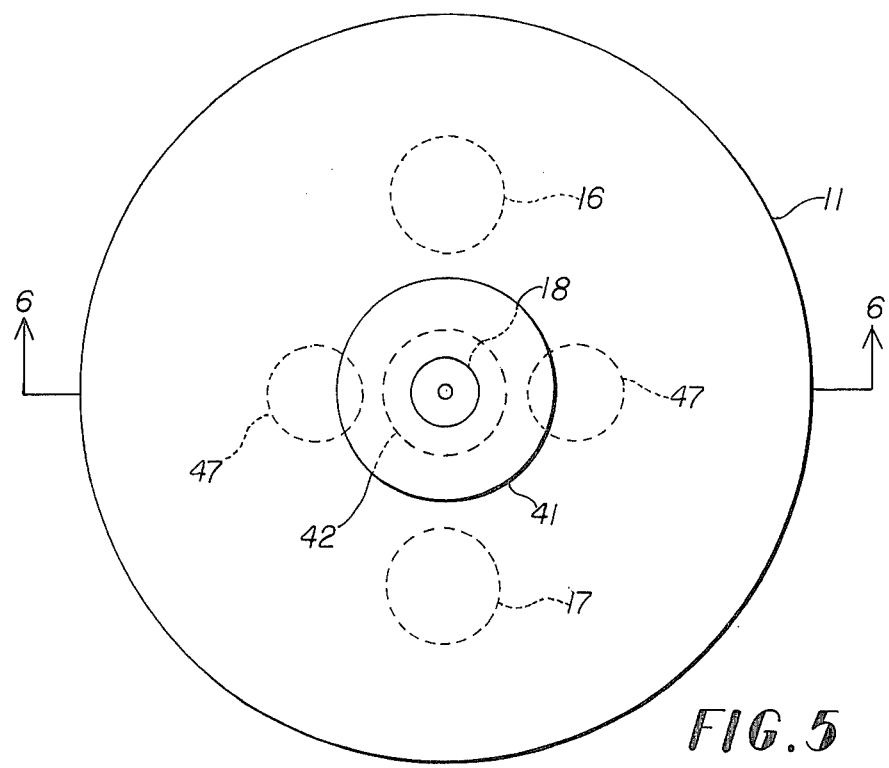
FIG. 5 is a diagramatic plan view illustrating the relative positions of various engine components in an engine embodiment shown in FIG. 6.
Figure 6:
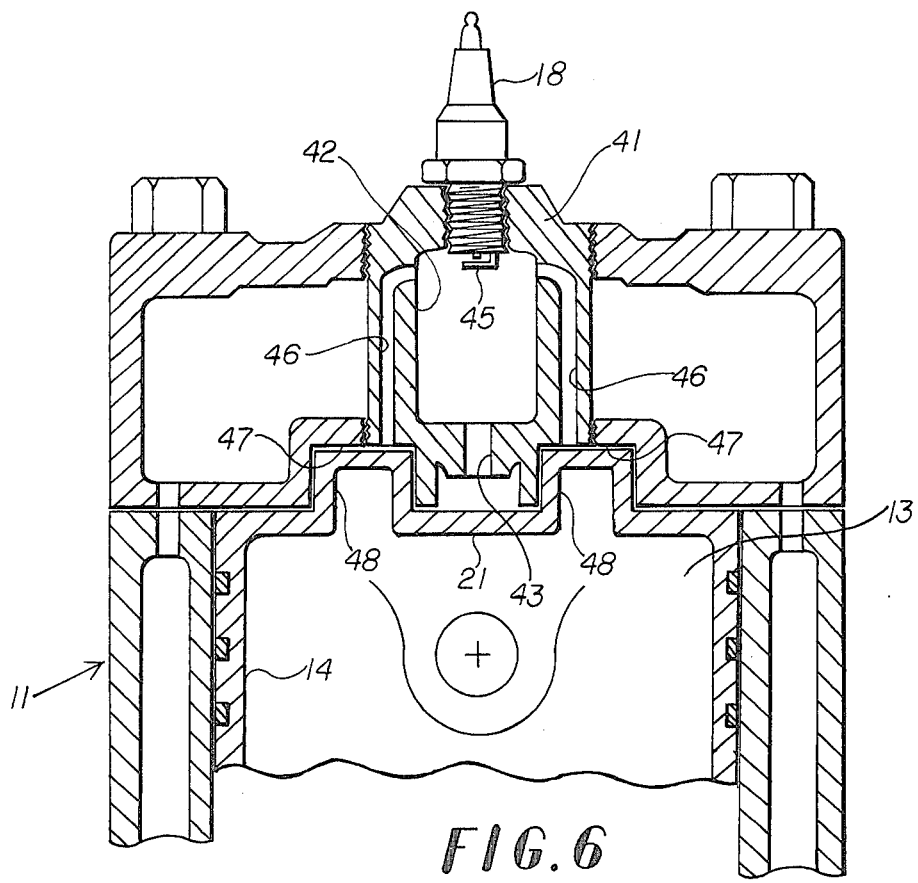
FIG. 6 is a cross sectional view taken along lines 6—6 of FIG. 5.

Referring now to FIGS. 5 and 6 there is shown still another embodiment of the invention in which component parts identical to those described above again have been given the same reference numerals. Engaged by threads in the engine body 11 is a housing 41 that defines an auxiliary chamber 42 and an orifice 43 that opens into the engine's primary combustion chamber 13. Also defined by the housing 41 are a pair of transfer passages 46 extending between the end of the auxiliary chamber 42 opposite the orifice 43 and a pair of purge chambers formed in the engine body 11. Projecting out of the end wall 21 of the primary piston 14 are a pair of purge piston portions 48 that are received by the purge chambers 47 upon completion of a compression stroke as shown in FIG. 6.

Operation of this embodiment is similar to that of the embodiments described above except that the mechanical purging provided by the auxiliary pistons 26 and 33 is here replaced by an hydraulic purge mechanism powered by the purge piston portions 48. Movement of the purge piston portions 48 into the purge chambers 47 at the completion of a compression stroke forces a volume of fuel charge through the transfer passages 46 into the auxiliary chamber 42. This incoming fuel charge functions as a purge mechanism moving through the chamber 42 and expelling any residual gases out of the orifice 42 which again serves as both an exhaust port for purging and as an orifice for subsequently permitting a flame jet to pass from the auxiliary combustion chamber 42 into the primary combustion chamber 13. As above, this flame jet is created by ignition of the fuel charge in the auxiliary chamber 42 and its movement through the primary chamber 13 insures complete mixing and combustion of the fuel mixture therein.

Obviously, many modifications and variations of the present invention are possible in light of the above teachings. For example only, although the embodiments described herein comprise single cylinder engines for reasons of simplicity, it will be appreciated that the novel features disclosed could be incorporated into multi-cylinder engines as well. It is to be understood, therefore, that the invention can be practiced otherwise than as specifically described.

What is claimed is:

1. Internal combustion engine apparatus comprising:
    body cylinder means defining a primary combustion chamber; p1 a primary piston reciprocable in said cylinder means during compression and power strokes, respectively, that reduce and increase the volume of said primary combustion chamber;
    intake means for periodically introducing fuel charges into said primary combustion chamber;
    ignition means for igniting the fuel charges introduced by said charge means;
    exhaust means for removing residual gases from said primary combustion chamber after ignition of each fuel charge;
    housing means mounted on and movable with said primary piston and defining an auxiliary combustion chamber, said housing means further defining an orifice providing communication between said primary and auxiliary combustion chambers; and
    purge means comprising an auxiliary piston reciprocable in said auxiliary combustion chamber, said auxiliary piston being biased by a bias means toward a closed position wherein said orifice is closed and movable during each compression stroke of said primary piston into a fully open position to allow complete filling of said auxiliary chamber with a fuel charge in response to a given pressure in said primary chamber substantially less than the maximum compression pressure provided therein by said primary piston, said auxiliary piston being adapted to move into said closed position during each power stroke of said primary piston so as to purge through said orifice substantially all residual gases from said auxiliary combustion chamber.

2. Apparatus according to claim 1 including heat exchange means for cooling said housing means.

3. Apparatus according to claim 1 wherein said bias means comprises a spring member selected so as to provide reciprocable movement of said auxiliary piston in response to pressure changes in said primary combustion chamber produced by movement of said piston means therein.

4. Apparatus according to claim 1 wherein said housing means is mounted in a wall of said primary piston with said orifice disposed in a side of said primary piston wall facing said primary combustion chamber, and the portion of said housing defining said auxiliary chamber extending out of the opposite side of said primary piston wall.

5. Apparatus according to claim 1 wherein the cross-section of said orifice is substantially less than that of said auxiliary combustion chamber.

* * * * *